United States Patent [19]

Tibi

[11] Patent Number: 5,594,723
[45] Date of Patent: Jan. 14, 1997

[54] ATM INFORMATION SYSTEM AND MULTIPLEXER FOR ASSIGNING AND CONTROLLING ACCESS TIME

[75] Inventor: Georges Tibi, Fontenay aux Roses, France

[73] Assignee: U.S. Philips Corporation, New York, N.Y.

[21] Appl. No.: 217,525

[22] Filed: Mar. 24, 1994

[30] Foreign Application Priority Data

Mar. 31, 1993 [FR] France .................................. 93 03775

[51] Int. Cl.⁶ .................................................... H04Q 11/04
[52] U.S. Cl. ........................... 370/396; 370/412; 370/462; 370/468
[58] Field of Search ........................... 370/60.1, 60, 94.1, 370/84, 56, 85.13, 85.1, 85.2, 62, 95.1

[56] References Cited

U.S. PATENT DOCUMENTS

| | | | |
|---|---|---|---|
| 4,213,201 | 7/1980 | Gagnier et al. | 370/62 |
| 5,117,420 | 5/1992 | Hillis et al. | 370/60 |
| 5,157,654 | 10/1992 | Cisneros | 370/94.1 |
| 5,251,209 | 10/1993 | Jurkevich et al. | 370/94.1 |
| 5,285,444 | 2/1994 | Sakurai et al. | 370/60 |
| 5,303,078 | 4/1994 | Brackett et al. | 370/60.1 |

OTHER PUBLICATIONS

Martin de Prycker, "Asynchronous Transfer Mode" (West Sussex, England: Ellis Horwood limited, 1991).
"Distributed Merger for ATM" R. Rocha et al, International Conference on Integrated Broadband Services and Networks, Oct. 15–18, 1990.

*Primary Examiner*—Douglas W. Olms
*Assistant Examiner*—Shick Hom

[57] ABSTRACT

A communication system comprising a network and an information multiplexing device for transmitting information cells from one of its accesses to another access. The multiplexing device includes a plurality of access terminals for transmitting information signals to a destination at a predetermined rate, at least one connecting terminal for one of the access terminals, a plurality of service circuits having queue elements for storing data and a common data line interconnecting the data outputs of the service circuits with the connecting terminal.

11 Claims, 3 Drawing Sheets

ATM INFORMATION SYSTEM AND MULTIPLEXER FOR ASSIGNING AND CONTROLLING ACCESS TIME

FIELD OF THE INVENTION

The present invention relates to a communication system comprising a network and an information multiplexing device which device transmits information cells from one of its accesses to another access and comprises:

- a plurality of access terminals for users who have information to be transmitted to a certain destination at a certain rate,
- at least one connecting terminal for one of the accesses of said network,
- a plurality of service circuits which include queue elements for storing user data,
- a common data line interconnecting the data outputs of said service circuits with the output port of the device.

ATM networks are increasingly distributed and to utilize them to the maximum of the possibilities they present it is suitable to multiplex the data the user wishes to transmit.

BACKGROUND OF THE INVENTION

A requirement posed on this type of device is that the rate of information signals to be carried does not exceed the rate the user has reserved in the network and for which he pays. If this rate is disregarded, the network to which the device is connected will become "a policing network" and will reject the excessive cells and the link will be disturbed much to the user's annoyance. This mechanism is known under the name of Usage Parameter Control UPC. This policing function is described in Martin de Prycker, *Asynchronous Transfer Mode* (England: Ellis Horwood Limited, 1991, 219–226.

A communication system of the type mentioned in the opening paragraph of this Application is known from the article: "DISTRIBUTED MERGER FOR ATM" by R. Rocha et at., published in International Conference on INTEGRATED BROADBAND SERVICES AND NETWORKS, dated Oct. 15–18, 1990.

This known communication system has the drawback that no measure is taken as regards said requirement.

The present invention proposes a communication system of the type mentioned hereinbefore which satisfies this requirement.

SUMMARY OF THE INVENTION

Therefore, a communication system of this type is characterized in that it further comprises:

- an assigning element for assigning access time to said common line for the queue elements, comprising an assignment Table which contains destination codes that define the destinations which are distributed at a transmit rate and a Table reading element for tapping said destination codes at a given rate,
- a decoding set for analysing said destination codes to control the access to the data line by the associated queue element by one of said codes.

According to a characteristic feature of the invention, a communication system of this type is characterized in that it further comprises an arbitration circuit to fix the instant of access to the information cells which the queue elements contain which queue elements are assigned to the same destination.

This characteristic feature brings with it the advantage that it permits realising the arbitration among N service circuits for access to said commonline while said requirement for each ATM network destination is observed.

DESCRIPTION OF (PREFERRED) EMBODIMENTS

The following description, accompanied by the appended drawings, all given by way of non-limiting example, will make it better understood how the invention can be realised.

DETAILED DESCRIPTION OF THE PREFERRED EMBODIMENT

Figure 1:
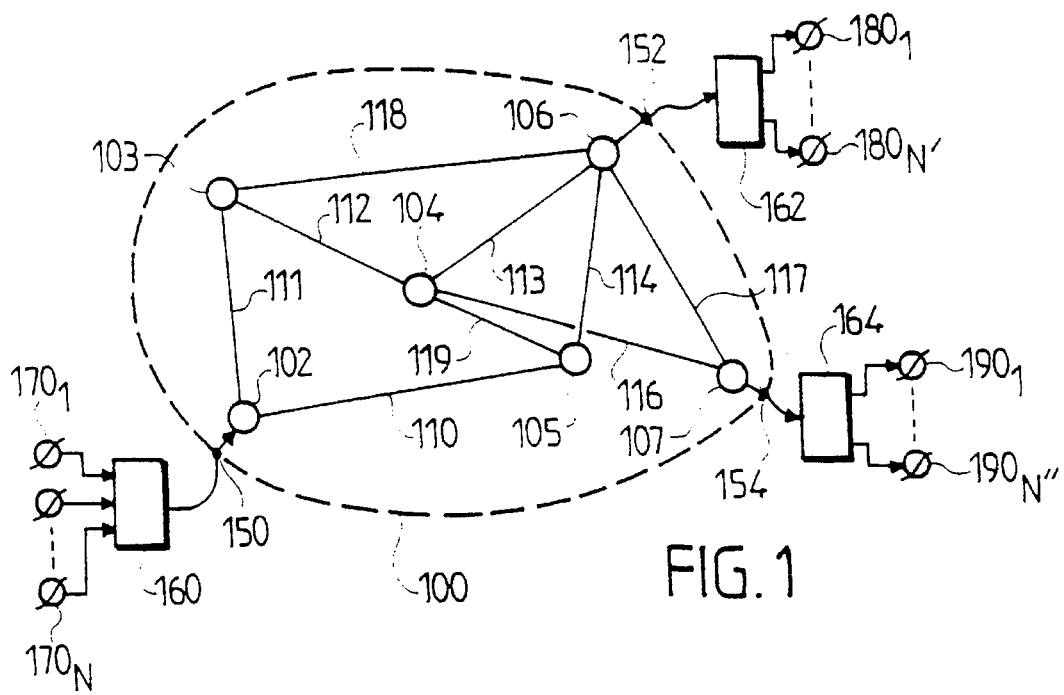
FIG. 1 shows a network to which a multiplexing device according to the invention is connected.
Figure 2:
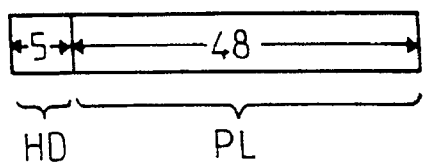
FIG. 2 shows the structure of information cells transmitted through the network.

FIG. 1 gives a diagrammatic representation of an ATM network 100. A description of this network will be found in the publication entitled "ASYNCHRONOUS TRANSFER MODE" by MARTIN DE PRYCKER mentioned above. This network is formed by various nodes 102, 103, 104, 105 and 106 interconnected by links 110 to 118 to connect the nodes 102–105, 102–103, 103–104, 104–106, 105–106, 104–105, 104–107, 106–107, 103–106 respectively. With respect to the nodes 102, 106, 107, accesses of this network which are situated at different geographical locations are referenced 150, 152 and 154 respectively. To these accesses are connected various multiplexing and demultiplexing devices 160, 162 and 164. Among these devices there are to distinguished: a multiplexing device 160, the object of the present invention, and two demultiplexing devices 164 and 162 which perform the reverse operations to those of the device 160. Thus, within the framework of the example described, the information signals can go from the device 160 to the devices 162 and 164 by passing through network 100. These signals to be transmitted are applied to a plurality of access terminals $170_1$ to $170_N$ which the multiplexing device 160 has and can be produced, among other things, on output terminals $180_1$ to $180_{N'}$ of device 162 and $190_1$ to $190_{N''}$ of device 164. The information signals transmitted in the network are presented in the form of cells whose organization is shown in FIG. 2. These cells are formed by 53 octets: 5 of them constitute the header HD and the other 48 octets PL contain the data for a transmitting service which data are accompanied, as required, by additional information signals to reconstitute the data of this service on reception.

Figure 3:
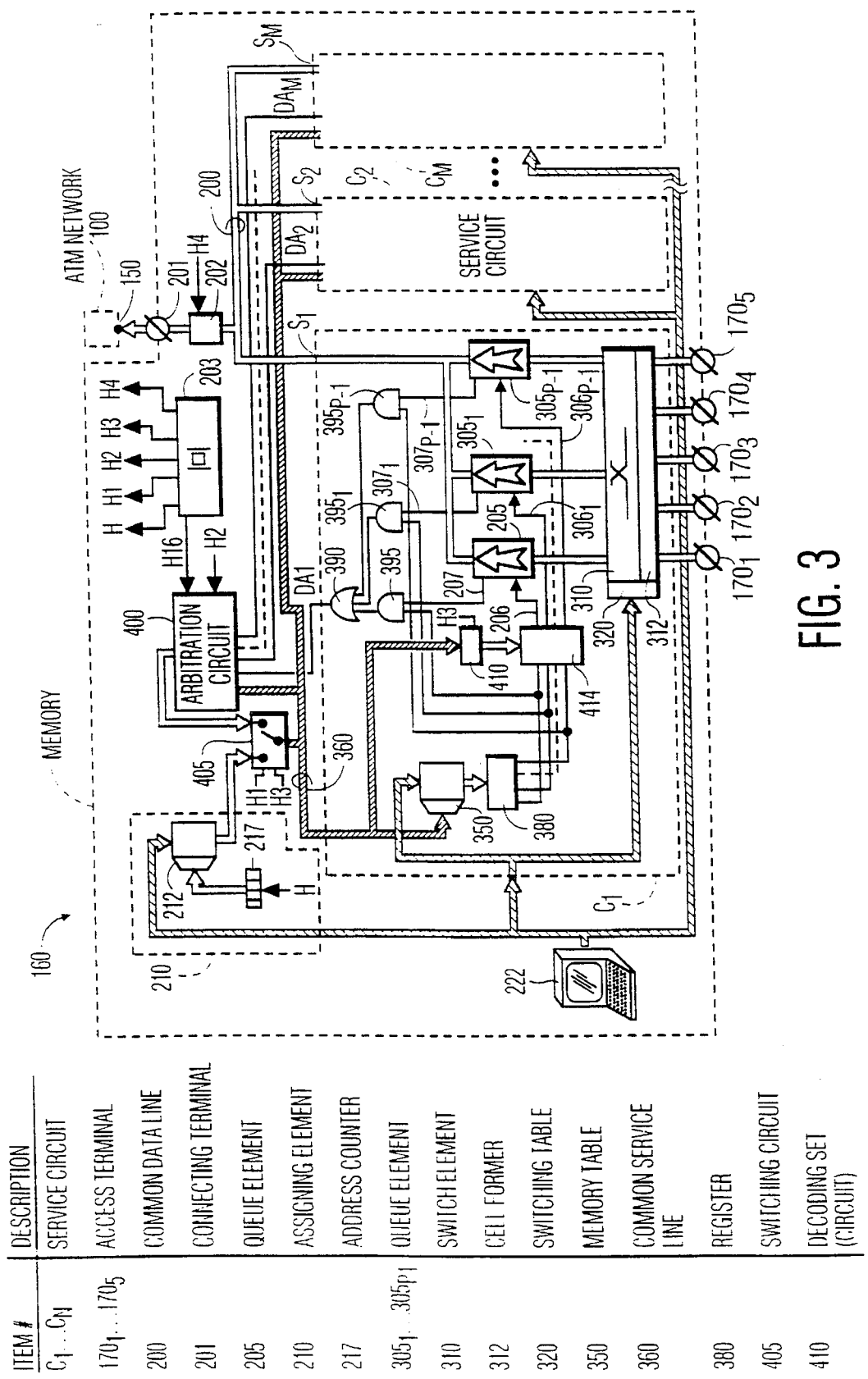
FIG. 3 shows a multiplexing device according to the invention.

FIG. 3 shows an embodiment for a multiplexing device 160 according to the invention.

It is formed by a plurality of service circuits $C_1, C_2, \ldots, C_M$ each having an output $S_1, S_2, \ldots, S_M$ respectively, connected to a common data line 200 which is connected to the connecting terminal 201 via an output circuit 202. This circuit 202 carries out various processes to adapt the signals for transmission through an ATM network. This output circuit does not accept the signals from this data line 200 until a signal H4 produced by a clock 203 is active.

To each of these circuits are connected user access terminals: terminals $170_1$ to $170_5$ for the circuit $C_1$ and terminals $170_6$ to $170_N$ (not shown in FIG. 3) for the other circuits. Each circuit $C_1, C_2 \ldots, C_M$ comprises at least one queue element formed by a memory of the FIFO type (first in first out). This is realised in practice by means of a read/write memory which comprises independent reading and writing circuits. Reference numeral 205 denotes a first queue element contained in circuit $C_1$. Reference numeral 206 denotes a line which conveys the read control signal and 207 denotes the line which transmits the read/write memory signal and other terms indicating whether the memory contains or does not contain at least one cell.

According to the invention, the multiplexing device 160 shown in FIG. 3 further comprises an assigning element 210 which permits periods of access to the common line 200 from queue elements included in the various circuits $C_1, C_2, \ldots, C_M$, so that cells are transmitted to the connecting terminal 201 via the common line 200 and the output circuit 202. The element 210 comprises an assignment Table constituted by a read/write memory 212 which contains destination codes which are distributed in a manner explained below and a Table reading element provided for reading said destination codes at a given rate. The reading element is formed by an address counter 217 of said memory. The counter counts the pulses H at a fixed rate from the clock circuit 203, so that the memory 212 is permanently read in a cyclic manner.

Memory 212 of element 210 is programmed from a management circuit 222 which may be formed by a personal computer PC. A management circuit of the multiplexing device takes the rate requirements for the various destinations into consideration and formulates for the management circuit of the network a request to obtain the necessary sources for the intended traffic. This request being accepted, the management circuit of the network then produces a VPI code (Virtual Path Identifier) which represents the destination in the form of 8 bits. The management circuit of the device then writes the memory 212 on the basis of the following considerations.

The frequency of the clock pulses determines the maximum rate at which transmission is likely to take place. Let us take a practical example of $149.76 \times 10^6$ bits/s (bits per second), thus the period of time for the pulses H is 2.83 μs. Then, if the traffic required for a specific destination has this maximum rate, all the locations of the memory will be taken up by this service. The size of this memory is partly defined by the minimum rate $d_{min}$ to be ensured, for example, $4.5 \times 10^3$ bits/s. The size of the memory is thus 32768 locations. This size is also defined by the composition of the transmit rates i.e. the entirety of the different rates that can be transmitted. The larger the number of possible rates is, the larger the Table size will be.

Figure 4:
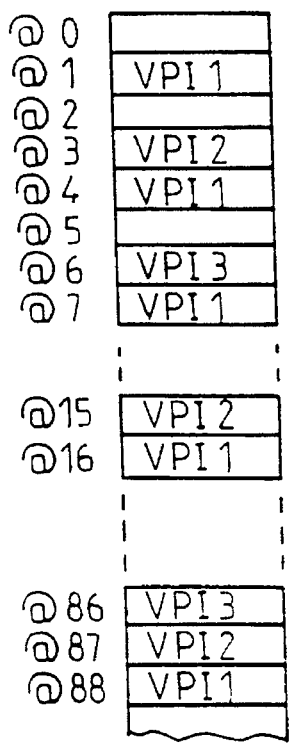
FIG. 4 shows an example of the distribution of destination codes in the assignment Table.

With respect to FIG. 4, the codes VPI1, VPI2 and VPI3 constituting the codes of three destinations are shown. Thus, the codes VPI1 are written every third address, that is, at addresses @1, @4, @7, ..., @16, ..., @88, ..., which corresponds to services of $50 \times 10^6$ bits/s. The codes VPI2 are written every 12 addresses, that is, @3, @15, ..., @87, which corresponds to a service of $12.5 \times 10^6$ bits/s and, finally, the codes VPI3 are written every 80 addresses, that is, @6, @86, which corresponds to a service of $1.87 \times 10^6$ bits/s. In brief, for a given rate "d" and a given destination, the following operations are carried out:

the spacing of the address codes Δ@ is calculated by:

$$\Delta@ = 32768 \times d_{min}/d$$

in memory 212 is written the destination code a first time at the first available location @D, all the other codes are written at the locations @D+K.Δ@ (k="1, 2, 3, ... ) until the end of the memory is reached, if one of said locations is occupied by another code, a next available location is sought, that is, @D+K.Δ@+p(p=1, 2, 3, ...).

In principle, the circuits $C_1, C_2, \ldots, C_M$ are each assigned to a given service. For example, circuit $C_1$ is assigned to video links, of the video conferencing type, circuit $C_2$ to telephone links and circuit $C_M$ to local network extensions.

Advantageously, the circuits $C_1, C_2, \ldots, C_M$ comprise a plurality P of queue elements. Thus, in FIG. 3 circuit $C_1$ comprises, besides element 205, the elements $305_1$ to $305_{P-1}$ with their wires $306_1$ to $306_{P-1}$ and $307_1$ to $307_{P-1}$ which correspond to wires 206 and 207 respectively. A switch element 310 makes it possible to switch the various access terminals to the queue elements 205, $305_1$ to $305_{P-1}$. This switch element can be coupled to a cell former 312 in the case where they would not be formed at the user's. There is no need to describe this in more detail, because the invention does not relate thereto. The switching performed by element 310 is defined by a Table 320. This table is written by means of the management circuit 222 to realise correspondence between one of the access terminals $170_1$ to $170_5$ on which a user produces information signals, and one of the queue elements 205, $305_1$ to $305_{P-1}$.

A Table formed by a memory 350 makes it possible to manage inside the service circuits the access of various queue elements to line 200. This Table is also written by means of the management circuit 222 which assigns a queue element to a VPI code produced by the management circuit of the network. This assignment is made while there is evidently considered whether these queue elements are available. This Table is addressed in fixed time intervals by signals H1 produced by the clock 203, by the various codes coming from Table 212 and transmitted by a service line 360 shared by all the service circuits $C_2, \ldots, C_M$. This Table 350 produces in this fashion the code which validates or does not validate a queue element. A register 380 maintains this validation code for a period H. An OR-gate 390 produces a signal DA1 which, when active, signals that at least one element of circuit $C_1$ is concerned with the destination code and that this element contains at least one cell. This is determined by a set of AND-gates 395: $395_1$ to $395_{P-1}$ with two inputs of which the first inputs are connected to the wires 207, $307_1$ to $307_{P-1}$ and the second inputs to the outputs of register 380. The OR-gate 390 receives all the output signals of these AND gates. The signal DA1 is analyzed during time intervals fixed by the signals H2 which are produced by the clock 203, as well as the analog signals $DA_2, \ldots, DA_M$ by an arbitration circuit 400.

This arbitration circuit 400 produces, in time intervals fixed by the signals H3 produced by the clock 203, on the common service line 360 a code which defines the circuit whose access to line 200 is authorized. A switching circuit 405 controlled by the signals H1 and H3 makes it possible to permit access to this service line either to memory 212 or to the arbitration circuit 400 in response to active values of the signals H1 and H3. As each service circuit is assigned an identification code, a decoding circuit 410 (detecting this identification code) produces an active signal when the circuit is selected by the arbitration circuit 400. This active signal is validated in time intervals fixed by the clock signal H3. The decoding signal coming from circuit 410 makes it possible to select one of the queue elements if one of them is affected by this operation via a validation circuit 414 which allows the codes contained in register 380 to pass.

Figure 5:
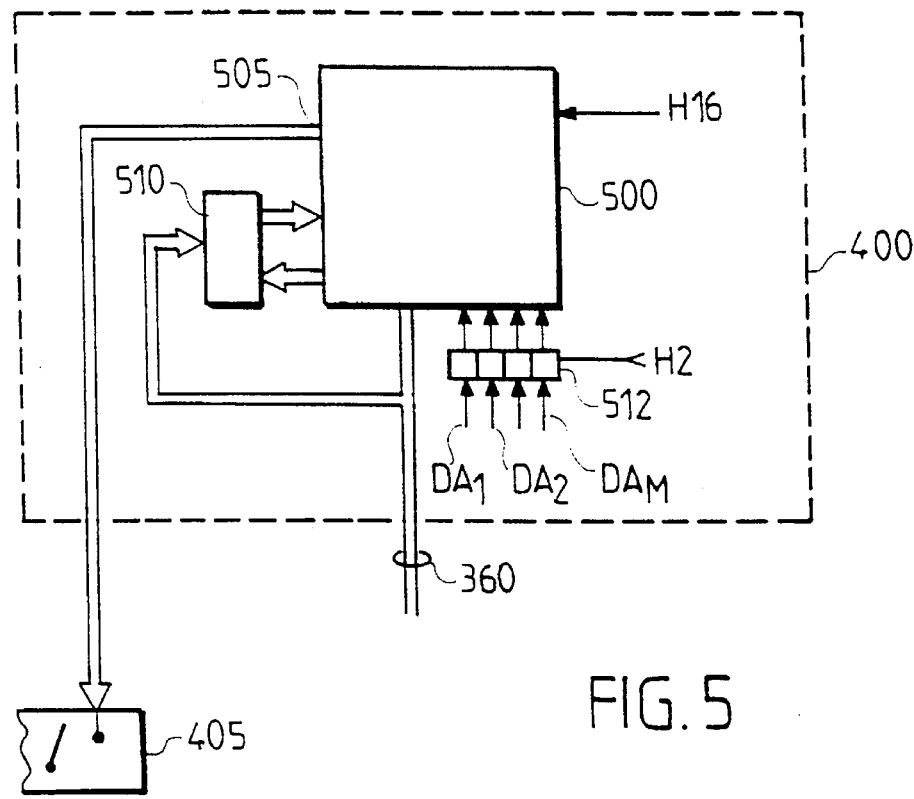
FIG. 5 shows the structure of the arbitration circuit.

Arbitration circuit 400 is structured in a manner shown in FIG. 5. It is formed by a processing circuit 500 of which an output part 505 produces the code of the service circuit to which the access to the output circuit 202 is given. A status memory 510 contains previous statuses and especially the identification of the circuit that has gained access for a certain VPI. The inputs of the circuit 500 are formed, on the one hand, by the signals $DA_1, DA_2, \ldots, DA_M$ which pass through a buffer register 512 controlled by the signals H2 and, on the other hand, by the VPI code transmitted by the line 360. Memory 510 contains as many memory locations as VPI codes that can occur i.e. 256. The arbitration operates according to a rotating priority of the type described in the publication: "DISTRIBUTED-PROCESSOR COMMUNICATION ARCHITECTURE" by Kenneth J. Thurber and Gerald M. Masson, published in Lexington Books, Heatch., Chapter 5, pages 140 and 141.

The priority is determined in various calculation phases, determined by a clock signal H16 which has a frequency sixteen times higher than that of the signals H.

The arbitration context for a given destination is stored in memory 510 at an address derived from the VPI number corresponding to this destination.

An arbitration sequence is then formed in the following phases:

the arbitration context relating to the VPI code is read from memory 510, the arbitration between the various access circuits is carried out according to the mechanism of rotating priority, the code of the circuit that has gained access is transmitted by line 360, the new arbitration context relating to the VPI code is written in memory 510.

Figure 6:
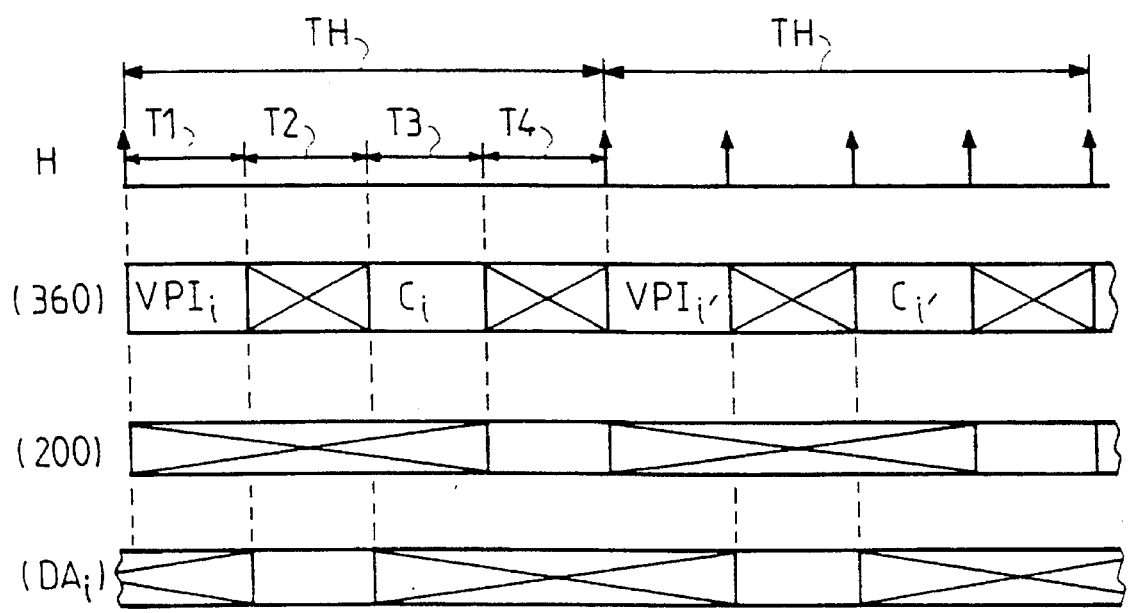
FIG. 6 shows the assignment of service time periods which assignment relates to the multiplexing device according to the invention.

The time diagram of FIG. 6 gives a summary of the operation of the device according to the invention. The active edge of the signals H is represented by a rising arrow at H. Particularly at this edge counter 217 is incremented as has already been observed. The period TH which elapses between these active edges is subdivided into four sub-periods T1, T2, T3 and T4. During the sub-period T1 line 360 transmits the VPI access codes, during sub-period T2 the signals $DA_i$ are transmitted to the arbitration circuit 400, during sub-period T3 the line 360 transmits the identification code of the circuit that has access to the network and during sub-period T4 the data line 200 is used for effectively transmitting these data. The sub-periods T1, T2, T3 and T4 are fixed, respectively, by means of clock signals H1, H2, H3 and H4.

What is claimed is:

1. A communication system comprising:

a network for transmitting information cells from one of a plurality of accesses to another access; and an information multiplexing device operatively connected to said one of said accesses, said multiplexing device comprising:

a plurality of access terminals for receiving information cells to be transmitted to a destination access at a predetermined rate;

a connecting terminal for connecting said multiplexing device to said network;

a plurality of service circuits, each service circuit including at least one queue element for storing said information cells;

a common data line for coupling an output of each of said plurality of service circuits to said connecting terminal;

an assigning element for assigning access time to said common data line for each queue element within each service circuit, said assigning element including:

an assignment table including destination codes defining respective destinations, wherein a selected one of said destination codes is distributed throughout said assignment table whereby the number of occurrences of said selected one of said destination codes corresponds to a respective transmit rate for a corresponding one of said respective destinations; and a table reading element for reading said destination codes at a predetermined rate; and a decoding set for analyzing said destination codes output by said assigning element to control the access to the common data line by said at least one queue element of each of said service circuits.

2. The communication system as claimed in claim 1, further including an arbitration circuit for fixing an instant of access to said information cells included in one of said queue elements which are assigned to a single destination.

3. The communication system as claimed in claim 1, wherein each service circuit comprises a plurality of said queue elements.

4. The communication system as claimed in claim 3, wherein said information received by one of said plurality of service circuits is in a single predetermined format.

5. The communication system as claimed in claim 3, wherein one of said service circuits comprise a switch element for selectively connecting a predetermined one of said access terminals to one of said queue elements.

6. The communication system as claimed in claim 1, further including a further common service line for transmitting said destination codes to said service circuits, and wherein the decoding set is formed by decoding circuits, a decoding circuit connected to each of said service circuits to control the queue element which form part of the same service circuit.

7. The communication system as claimed in claim 1, further including a clock circuit for allocating a plurality of service time periods for said common data line.

8. The communication system as claimed in claim 2, wherein a first service time period is assigned for transmitting said destination codes and a second time period is assigned for transmitting an arbitration code produced by said arbitration circuit to authorize access to said queue element.

9. The communication system as claimed in claim 2, wherein each service circuit comprises a plurality of queue elements.

10. The communication system as claimed in claim 4, wherein one of said service circuits comprises a switch element for selectively connecting a predetermined one of access terminals to one of said queue elements.

11. An information multiplexing device for use with a network for transmitting information cells from one of a plurality of accesses to another access via said network, comprising:

- a plurality of access terminals for receiving information cells to be transmitted to a destination access at a predetermined rate;
- a connecting terminal for connecting said multiplexing device to said network;
- a plurality of service circuits, each service circuit including at least one queue element for storing said information cells;
- a common data line for coupling an output of each of said plurality of service circuits to said connecting terminal;
- an assigning element for assigning access time to said common data line for said queue element within each service circuit, said assigning element including:
  - an assignment table including a plurality of destination codes defining respective destinations, wherein the number of occurrences of each of said destination codes corresponds to a transmit rate associated with each one of said respective destinations; and
  - a table reading element for reading said destination codes at a predetermined rate; and
- a decoding set for analyzing said destination codes output by said assigning element to control the access to the common data line by said at least one queue element of each of said service circuits.

* * * * *